United States Patent
Tasaki et al.

(10) Patent No.: US 9,016,207 B2
(45) Date of Patent: Apr. 28, 2015

(54) GAS GENERATOR FOR AIRBAG DEVICE

(75) Inventors: Yoji Tasaki, Aichi (JP); Mitsuharu Nakamura, Aichi (JP); Ryutaro Shiraishi, Aichi (JP); Koji Saiki, Aichi (JP); Jianlin Chen, Aichi (JP)

(73) Assignee: Autoliv ASP, Inc., Ogden, UT (US)

( * ) Notice: Subject to any disclaimer, the term of this patent is extended or adjusted under 35 U.S.C. 154(b) by 79 days.

(21) Appl. No.: 13/145,901

(22) PCT Filed: Jan. 21, 2010

(86) PCT No.: PCT/JP2010/050672
§ 371 (c)(1),
(2), (4) Date: Oct. 7, 2011

(87) PCT Pub. No.: WO2010/084899
PCT Pub. Date: Jul. 29, 2010

(65) Prior Publication Data
US 2012/0037030 A1 Feb. 16, 2012

(30) Foreign Application Priority Data

Jan. 22, 2009 (JP) .................................. 2009-012230
Aug. 17, 2009 (JP) .................................. 2009-188706

(51) Int. Cl.
| | | |
|---|---|---|
| F42B 3/02 | (2006.01) | |
| B60R 21/264 | (2006.01) | |
| F42B 3/04 | (2006.01) | |
| B60R 21/263 | (2011.01) | |

(52) U.S. Cl.
CPC ..... *B60R 21/2644* (2013.01); *B60R 2021/2633* (2013.01); *B60R 2021/2648* (2013.01); *F42B 3/04* (2013.01)

(58) Field of Classification Search
CPC ........................................................ F42B 3/04
USPC ............. 102/530, 531, 202.12; 280/736, 741
See application file for complete search history.

(56) References Cited

U.S. PATENT DOCUMENTS 5,345,875 A * 9/1994 Anderson ...................... 102/530
5,364,126 A * 11/1994 Kuretake et al. ............ 280/730.1
(Continued)

FOREIGN PATENT DOCUMENTS

| JP | 5-317685 | 12/1993 |
|---|---|---|
| JP | 2003-191816 | 7/2003 |

(Continued)

OTHER PUBLICATIONS

International Search Report for International Application No. PCT/JP2010/050672 Mailed on Mar. 23, 2010 (2 pages).

*Primary Examiner* — Reginald Tillman, Jr.
(74) *Attorney, Agent, or Firm* — Brinks Gilson & Lione

(57) ABSTRACT

A small, lightweight, and inexpensive gas generator for an airbag device. The gas generator for an airbag device according to the present invention includes: a deployment activating initiator that accommodates a predetermined amount of ignition powder and is activated by an impact on a vehicle; a main gas generating agent that generates a main gas for inflating an airbag when burned; a main gas generation chamber that accommodates the main gas generating agent; a secondary gas generation chamber that is provided in an interior of the main gas generation chamber and accommodates the initiator; and a secondary gas generating agent accommodated in the secondary gas generation chamber.

9 Claims, 12 Drawing Sheets

(56) References Cited

U.S. PATENT DOCUMENTS

| | | | |
|---|---|---|---|
| 5,622,380 A * | 4/1997 | Khandhadia et al. | 280/736 |
| 5,829,785 A * | 11/1998 | Jordan et al. | 280/741 |
| 6,062,143 A * | 5/2000 | Grace et al. | 102/530 |
| 6,491,321 B1 * | 12/2002 | Nakashima et al. | 280/736 |
| 6,527,297 B1 * | 3/2003 | Parkinson et al. | 280/741 |
| 6,644,206 B2 * | 11/2003 | Fogle, Jr. | 102/530 |
| 6,860,511 B2 * | 3/2005 | Patterson | 280/741 |
| 7,293,798 B2 * | 11/2007 | Burns et al. | 280/741 |
| 7,527,289 B2 * | 5/2009 | Numoto et al. | 280/736 |
| 7,703,395 B2 * | 4/2010 | Cook et al. | 102/530 |
| 7,784,829 B2 * | 8/2010 | Hirooka et al. | 280/741 |
| 7,806,435 B2 * | 10/2010 | Yamazaki | 280/741 |
| 7,806,954 B2 * | 10/2010 | Quioc | 55/385.3 |
| 8,459,187 B2 * | 6/2013 | Nakayasu et al. | 102/530 |
| 2009/0295132 A1 * | 12/2009 | Jackson et al. | 280/736 |

FOREIGN PATENT DOCUMENTS

| | | |
|---|---|---|
| JP | 2004-237971 | 8/2004 |
| JP | 2005-349849 | 12/2005 |
| JP | 2006-027291 | 2/2006 |
| JP | 2008-105618 | 5/2008 |
| JP | 2008-279914 | 11/2008 |
| JP | 2009-149215 | 7/2009 |

* cited by examiner

PRIOR ART

PRIOR ART

GAS GENERATOR FOR AIRBAG DEVICE

BACKGROUND

1. Field of the Invention

The present invention relates to an airbag device installed in a vehicle, and more particularly to a gas generator that supplies inflation gas to an airbag.

2. Related Technology

A vehicle such as an automobile is installed with an airbag system that rapidly inflates an airbag using gas in order to prevent an occupant from colliding with a dangerous location. The occupant is thus prevented from injury or death occurring when the occupant crashes into a hard part of the vehicle interior, such as a steering wheel or a windshield, during a collision, accident or the like. The airbag is structured to deploy when inflation gas is supplied thereto from a gas generator.

Patent Document 1, Japanese Patent Application Publication No. H5-317685, discloses an example of a conventional gas generator for an airbag.

This conventional gas generator uses three types of powder, namely an initiator that is ignited by an electric signal, an ignition powder igniter that promotes ignition of a gas generating agent by amplifying a flame generated by the initiator such that the flame is transmitted to the gas generating agent, and the gas generating agent for generating inflation gas. The three types of powder respectively have individual functions and are therefore accommodated or held in individual containers. As a result, the structure of the gas generator is complicated.

To solve this problem, a gas generator in which the ignition powder igniter is incorporated into the initiator has been proposed.

FIG. 3 is a sectional view illustrating an example (Patent Document 2, Japanese Patent Application Publication No. 2008-105618, for example) of the structure of a single stage type inflator 1. A housing 2 is constituted by a diffuser 2a, an adapter 2b, and a base 2c, and the following constitutional elements, for example, are accommodated in the housing 2.

An initiator 3 is ignited by an electric signal and a tube 4 separates the initiator 3 from a gas generating agent 7. Both the initiator 3 and the tube 4 are attached to the adapter 2b. A cup 6 houses an ignition powder 5 and is disposed inside the tube 4, and the ignition powder 5 in the cup 6 is burned by ignition energy from the initiator 3 causing thermal particles to pass through the entirety of the gas generating agent 7 such that a large amount of gas is generated instantaneously.

The generated gas passes through a filter 8, disposed along an inner peripheral side of an inner wall portion of the housing 2, bursts through aluminum foil 9 adhered to a gas ejecting hole 2aa provided in a side wall of the diffuser 2a, and is thus ejected from the gas ejecting hole 2aa so as to inflate the airbag.

The inflator having the above constitution uses three types of powder, namely the initiator, the ignition powder, and the gas generating agent, and these three types of powder respectively have individual functions. Therefore, individual containers must be provided to accommodate the three types of powder.

The amount of generated gas for inflating the airbag is determined by the amount of gas generating agent. Hence, in the inflator having the above constitution, a charging space for the gas generating agent is limited by a space corresponding to the volume of the ignition powder, the cup and the tube serving as a partition wall thereof. Accordingly, the gas generation amount is also limited.

As shown in FIG. 4, to solve the problem of requiring individual containers to accommodate the three types of powder, an inflator 1 that uses a large initiator 3 into which the ignition powder 5 is incorporated in advance and does not include a cup and a tube is available.

However, to ignite the gas generating agent sufficiently, a substantially identical amount of ignition powder to that of the inflator described above must be charged into the initiator. As a result, the size of the initiator becomes extremely large, and therefore the space for charging the gas generating agent remains limited.

A columnar agent or a hollow cylindrical agent is often used as the gas generating agent 7. A columnar gas generating agent is easy to manufacture and can be charged at a high density. As a result, a small, lightweight, and inexpensive gas generator can be obtained.

In the gas generator structured as shown in FIG. 4, a substantially identical amount of ignition powder to that of a conventional ignition powder igniter must be charged into the initiator 3 to ensure that the gas generating agent 7 is ignited sufficiently, and therefore the size of the initiator must be increased greatly. Hence, the structure and manufacturing process of the initiator 3 become complicated, leading to an increase in cost.

Incidentally, a powder that generates a large amount of combustion heat, such as boron potassium nitrate, strontium nitrate, or magnesium Teflon, is selected as the ignition powder. However, when these types of powder are used as the ignition powder charged into the large initiator, the gas generating agent may begin to burn after combustion of the ignition powder, and therefore a time delay may occur before gas is discharged from the inflator.

SUMMARY

The present invention has been designed in consideration of the conditions described above, and a first object thereof is to provide a gas generator for an airbag device that is small, lightweight, and inexpensive.

A second object is to provide a gas generator for an airbag that can avoid or reduce problems relating to an ignition delay.

A gas generator for an airbag device according to the present invention includes: a deployment activating initiator that accommodates a predetermined ignition powder and is activated by an impact on a vehicle; a main gas generating agent that generates a main gas for inflating an airbag when burned; a main gas generation chamber that accommodates the main gas generating agent; a secondary gas generation chamber that is provided in an interior of the main gas generation chamber and accommodates the initiator; and a secondary gas generating agent accommodated in the secondary gas generation chamber.

The gas generator for an airbag device is preferably structured such that when the initiator is activated, a shockwave is generated and the secondary gas generating agent is pulverized and burned by the shockwave, whereupon the main gas generating agent is ignited by the burning secondary gas generating agent.

Further, an appropriate amount of ZPP (Zirconium Potassium Percholate), THPP (Titanium Hydride Potassium Percholate), or the like may be charged into the interior of the initiator as a powder that generates a shockwave. In so doing, the secondary gas generating agent can be pulverized and burned instantaneously, and the main gas generating agent can be burned reliably without a delay. As a result, gas can be discharged quickly from the gas generator.

An identical substance may be used as the main gas generating agent and the secondary gas generating agent.

A nitrate-based gas generating agent may be used as the main gas generating agent and the secondary gas generating agent.

A weight ratio between the ignition powder in the initiator and the secondary gas generating agent is preferably set between 1:5 and 1:27.5.

A weight ratio between the secondary gas generating agent and the main gas generating agent is preferably set between 1:5.5 and 1:13.5.

A hole through which a combustion gas escapes is preferably provided in the secondary gas generation chamber.

An intermediate lid that covers the upper portion of the main gas generation chamber and the secondary gas generation chamber is preferably further provided.

As described above, with the gas generator according to the present invention, the gas generating agent is also accommodated in the secondary gas generation chamber, enabling an increase in the amount of generated gas relative to the overall volume of the inflator. As a result, reductions can be achieved in the size, weight, and cost of the inflator.

Further, by structuring the gas generator such that the secondary gas generating agent charged into the secondary gas generation chamber is pulverized by the shockwave from the initiator and ignited by the combustion gas, the secondary gas generating agent is burned quickly and reliably. Moreover, the main gas generating agent is burned reliably without a delay by the high speed/high temperature gas that is generated upon combustion of the secondary gas generating agent. Since the gas generating agent in the main gas generation chamber is burned reliably without a delay, a time delay before the inflation gas is discharged from the inflator can be suppressed to a minimum.

DETAILED DESCRIPTION OF THE PREFERRED EMBODIMENTS

Figure 1:
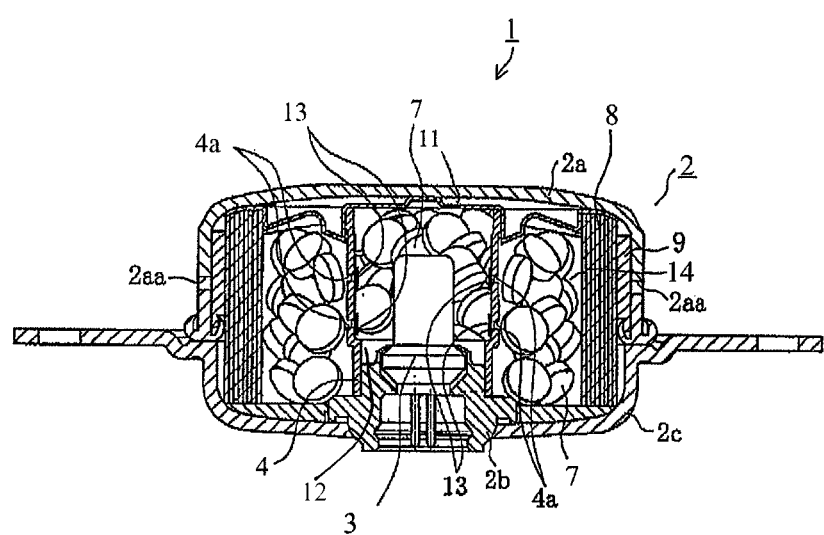
FIG. 1 is a sectional view of an inflator according to a first embodiment of the present invention.

Various embodiments of the present invention are described below. As will be understood to a person skilled in this technological field, except where expressly limited, various features of each embodiment are applicable to and can be applied to the each of the other embodiments. FIG. 1 is a sectional view of an inflator 1 according to a first embodiment of the present invention. An ignition powder, located within an initiator 3, is ignited by ignition heat from the initiator 3, and a resulting amount of heat is amplified such that a main gas generating agent or a propellant 7 begins to burn. A boron potassium nitrate (BKNO3)-based substance, for example, may be used as a representative composition of the ignition powder. The gas generating agent 7 mainly generates gas when burned. A guanidine nitrate-based substance, for example, may be used as a representative composition of the gas generating agent 7.

When ignited by an initiator, the ignition powder generates "fire" and "metallic thermal particles". A gas generating agent, meanwhile, generates "fire", "metallic thermal particles", and "gas", but does not burn as easily as the ignition powder.

The inventors have found that by inverting the characteristic described above, a larger amount of gas is generated at a constant inflator volume, leading to an increase in output.

To increase the amount of generated gas without altering the volume of the inflator 1, gas generating agent should be used instead of ignition powder. However, when the ignition powder is simply replaced by gas generating agent, it is not easy to reliably burn the gas generating agent.

Hence, the inventors arrived at raising an inner pressure of a container inner part that is ignited by the initiator during an initial stage of combustion such that the gas generating agent charged in place of the ignition powder can be burned sufficiently.

The present invention was realized as a result of the findings of the inventors, and as means for raising the inner pressure of the container inner part that is ignited by the initiator during the initial stage of combustion. As shown in FIG. 1, for example, a top of a tube 4, accommodating an initiator 3 in a lower portion thereof, is covered by an intermediate lid 11 to form a sealed secondary combustion chamber (secondary gas generation chamber) 12.

When the sealed secondary combustion chamber 12 is formed inside the tube 4 in this manner, the inner pressure of the secondary combustion chamber 12 rises rapidly during the initial stage of combustion because of the reduced volume of the chamber 12. Hence, when a gas generating agent 7, which does not burn as easily as ignition powder, is ignited by the initiator 3, combustion of the gas generating agent 7 located in the secondary combustion chamber 12 (hereinafter the secondary gas generating agent 7') is assisted, and as a result, the secondary gas generating agent 7' burns sufficiently.

In this case, ignition and combustion of the secondary gas generating agent 7' in the secondary combustion chamber (secondary gas generation chamber) 12 can be achieved more instantaneously and more reliably by determining an optimum size for one or more 4a provided in the tube 4.

Furthermore, when the holes 4a are blocked from the inside of the tube 4 using aluminum foil 13 of an appropriate thickness, for example, a flame and gas generated by the secondary gas generating agent 7' remains enclosed within the secondary combustion chamber (secondary gas generation chamber) 12 until the inner pressure of the secondary combustion chamber (secondary gas generation chamber) 12 reaches a sufficient pressure to rupture the aluminum foil 13. As a result, the inner pressure of the secondary combustion chamber (secondary gas generation chamber) 12 is raised in an even shorter amount of time.

After rupturing the aluminum foil 13, the combustion gas and the flame pass through the holes 4a provided in the tube 4 and propagate rapidly to a main combustion chamber (main gas generation chamber) 14, which is a ring-shaped space formed on two sides by an outer side of the tube 4 and a filter 8, and an upper portion of which is covered by the intermediate lid 11. Accordingly, the gas generating agent (hereinafter the main gas generating agent) 7 in the main combustion chamber (main gas generation chamber) 14 is burned in an ideal fashion. Note that in the example shown in FIG. 1, the intermediate lid 11 forming the secondary combustion chamber (secondary gas generation chamber) 12 and the main combustion chamber (main gas generation chamber) 14 is unitarily formed.

Hence, even though a gas generating agent that does not burn easily is used as the ignition powder, combustion of the gas generating agent 7 and 7' is assisted, and therefore the gas generating agent 7 7' is burned sufficiently. As a result, a larger gas generation amount can be obtained with a housing 2 enclosing the above elements and having an identical volume compared to that of the known technology.

The results of an experiment performed to confirm the effects of the present invention will be described below.

The experiment was performed on a first inflator 1 according to the present invention, as shown in FIG. 1, and on a second inflator according to the present invention, as shown in FIG. 1, in which the aluminum foil 13 blocking the holes 4a in the tube 4 were omitted from the inflator 1.

Figure 3:
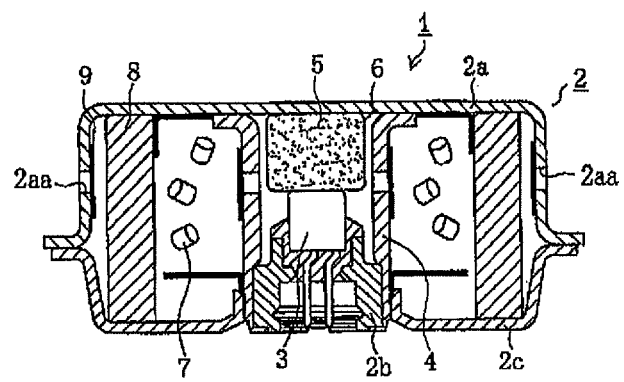
FIG. 3 is a sectional view showing an inflator of a known construction.
Figure 4:
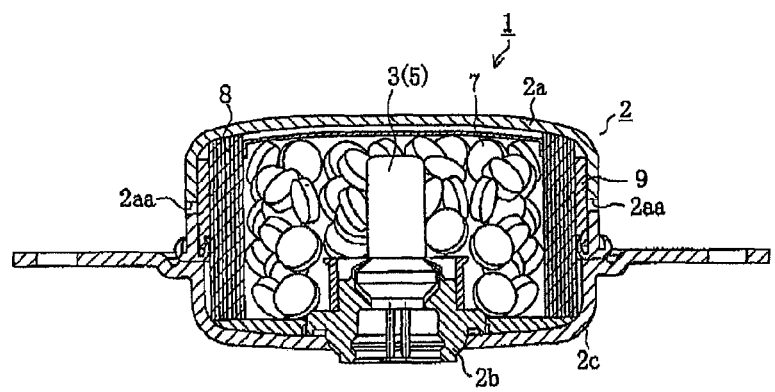
FIG. 4 is a sectional view showing another conventional inflator.

For comparison, the same experiment was performed on a conventional inflator as shown in FIG. 3 and on a comparative inflator, as shown in FIG. 1, but in which the tube 4 and the intermediate lid 11 were omitted from the inflator 1.

It should be noted that housings of an identical volume and identical gas generating agents were used in the experiment.

Figure 2:
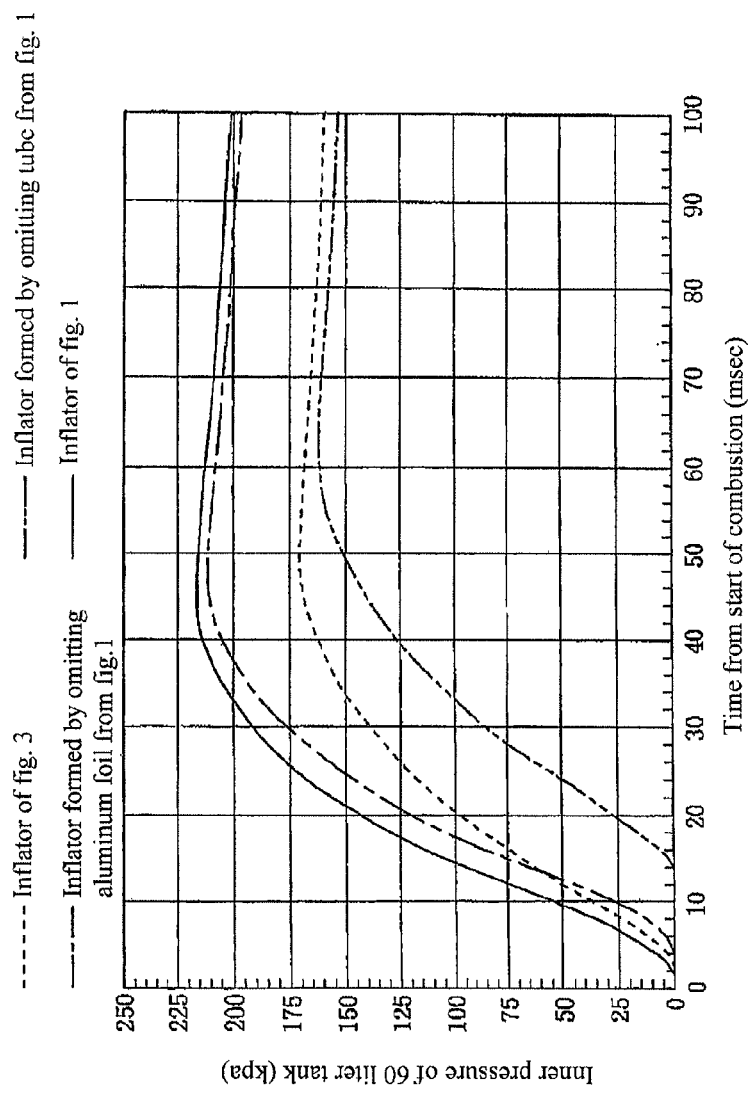
FIG. 2 is a graph showing the manner in which a tank's inner pressure rises during an inflator combustion test performed in a 60 liter combustion test tank.

Results of the experiment are shown in FIG. 2.

It can be seen that in the inflators 1 according to the present invention (shown by a solid line and a dot-dash line), the inner pressure of a 60 liter combustion test tank rises rapidly during the initial stage of combustion in comparison with the conventional inflator (dotted line) and the comparative inflator (dot-dot-dash line). Hence, the gas generating agent is burned sufficiently, and a high inner pressure is maintained thereafter.

It can also be seen that with the inflators 1 according to the present invention, the delay in the start of the increase in the inner pressure of the 60 liter combustion test tank is smaller in the first inflator 1 according to the present invention (solid line), in which the holes 4a in the tube 4 are blocked by the aluminum foil 13, than in the second inflator 1 according to the present invention (dot-dash line), in which the holes 4a in the tube 4 are not blocked.

In the embodiment shown in FIG. 1, the holes 4a are provided in the tube 4 and the holes 4a are blocked from the inside of the tube 4 by the aluminum foil 13. However, the holes 4a may be blocked by a material other than the aluminum foil 13, as long as the material is ruptured by a similar predetermined pressure. Alternatively, the holes 4a in the tube 4 may be left unblocked.

Further, as long as the intermediate lid 11 is detached when a predetermined inner pressure is reached, such that the flame and the gas in the secondary combustion chamber (secondary gas generation chamber) 12 can propagate to the main combustion chamber (main gas generation chamber) 14 through a gap between the tube 4 and the intermediate lid 11, the holes 4a need not be provided in the tube 4.

Furthermore, in FIG. 1, the intermediate lid 11 forming the secondary combustion chamber (secondary gas generation chamber) 12 and the main combustion chamber (main gas generation chamber) 14 is formed unitarily with the aim of reducing a number of manufacturing steps and so on, but a different intermediate lid may be used to form the secondary combustion chamber (secondary gas generation chamber) 12 and the main combustion chamber (main gas generation chamber) 14. Moreover, as long as the secondary combustion chamber (secondary gas generation chamber) 12 and the main combustion chamber (main gas generation chamber) 14 can be formed separate from one another, the intermediate lid 11 may be replaced by another element, or in certain cases eliminated.

Note that this embodiment may be applied not only to a single stage type inflator, but also to a double stage type inflator. Examples of double stage type inflators are discussed herein in connection with FIGS. 10 and 11.

Figure 5:
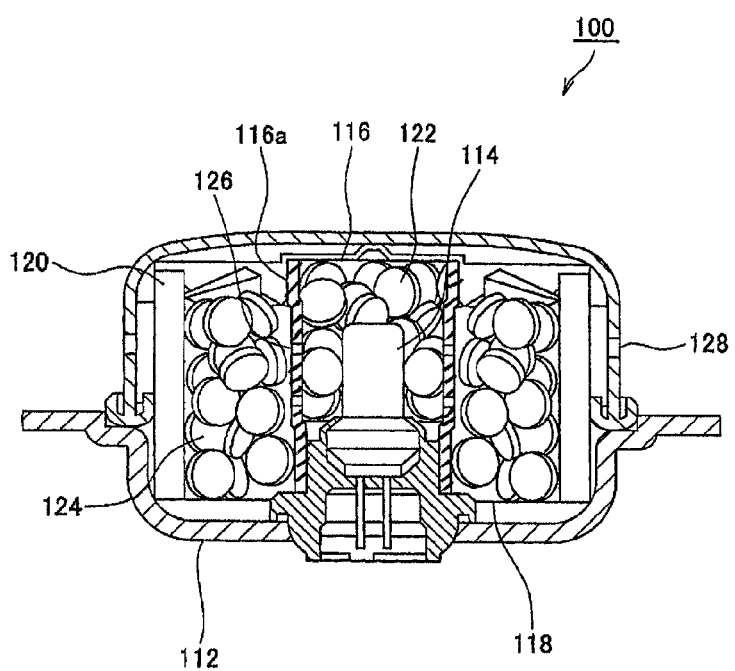
FIG. 5 is a sectional view showing the structure of a gas generator for an airbag device (driving seat single type) according to a second embodiment of the present invention.
Figure 6:
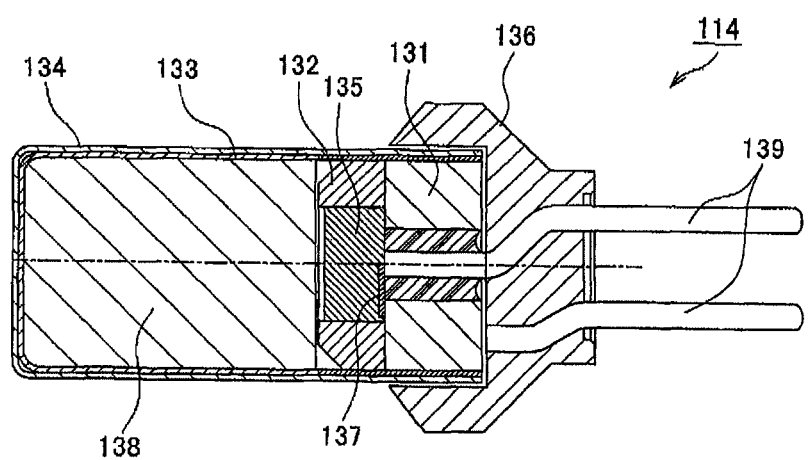
FIG. 6 is a sectional view showing the structure of an initiator used in the gas generator of FIG. 5.

FIG. 5 is a sectional view showing the structure of a gas generator for an airbag device (driving seat single type) 100 according to a second embodiment of the present invention. FIG. 6 is a sectional view showing the structure of an initiator 114 used in the gas generator for an airbag device 100. The gas generator for an airbag device 100 according to this embodiment includes a deployment activating initiator 114 that accommodates a predetermined amount of ignition powder (135, 138) activated by an impact on the vehicle, a main gas generating agent 124 that generates main gas for inflating an airbag when burned, a main gas generation chamber 118 that accommodates the main gas generating agent 124, a secondary gas generation chamber 116 that is provided in an interior of the main gas generation chamber 118 and accommodates the initiator 114, and a secondary gas generating agent 122 accommodated in the secondary gas generation chamber 116. When the initiator 114 is activated, a shockwave is generated, and the secondary gas generating agent 122 is pulverized and burned by the shockwave. When the secondary gas generating agent 122 burns, the main gas generating agent 128 is ignited.

A shockwave generation mechanism will now be described in detail. When the initiator 114 is activated, the ignition powder 135, 138 in the interior thereof is burned instantaneously. A metal case covering the initiator is ruptured (partially melted) by combustion gas generated at this time such that inflated gas in the metal case generates high-density combustion gas on the periphery of the initiator. This high-density combustion gas propagates through the entire region of an igniter tube as a combustion gas pressure wave. The propagating pressure wave of the high-density combustion gas serves as the shockwave. The shockwave possesses enough physical energy to crush the secondary gas generating agent. Therefore, the secondary gas generating agent is pulverized by the shockwave, leading to an increase in a surface area of the secondary gas generating agent, and as a result, combustion spreads rapidly, thereby facilitating ignition.

The gas generator 100 also includes a housing 112 constituted by an upper-lower pair of shells. The housing 112 may be molded by casting, forging, pressing, and so on. A plurality of gas discharging holes 128 are provided in a circumferential direction in a peripheral wall portion of the housing 112, and the airbag (not shown) is inflated and deployed by gas discharged through the discharging holes 128.

An igniter tube 116a forming the secondary gas generation chamber 116 may be formed by casting, forging, pressing, cutting, and so on, or a combination thereof. The initiator 114 is accommodated in the igniter tube 116a. A through hole 126 is formed in a peripheral wall of the igniter tube 116a as a flow passage for a flame that serves as a combustion source of the main gas generating agent 124 in the main gas generation chamber 118.

Here, the secondary gas generation chamber 116 must be surrounded by partition walls inside the main gas generation chamber 118, but as long as the secondary gas generation chamber 116 can be kept isolated from the main gas generation chamber 118 during the moment immediately before the shockwave passes through (until the secondary gas generating agent 122 is completely pulverized), an upper portion of the secondary gas generation chamber 116 does not necessarily have to be covered, or may be covered.

A coolant filter 120 for cleaning and cooling the gas that is generated upon ignition and combustion of the main gas generating agent 124 is provided in the housing 112. The coolant filter 120 is disposed to surround the main gas generating agent 124, and defines a ring-shaped chamber, or in other words the main gas generation chamber 118, on the periphery of the igniter tube 116a. The coolant filter 120 may be formed by laminating stainless steel wire mesh, for example, in a radial direction and then compressing the laminated wire mesh in the radial direction and an axial direction.

A columnar gas generating agent is used as the gas generating agent 124 since it is easy to manufacture and can be charged at a high density. In this embodiment, identical agents are used as the main gas generating agent 124 and the secondary gas generating agent 122. A nitrate-based powder containing an oxidant (basic copper (II) nitrate) and a combustible (guanidine nitrate) as main components is used as the gas generating agent 122, 124. The shape of the gas generating agent 122, 124 may be set at approximately diameter 6 mm, thickness 2 mm (1.6 to 2.5 mm). Note that gas generating agents having different shapes and compositions may be used as the main gas generating agent 124 and the secondary gas generating agent 122.

When a nitrate-based powder is used as the main gas generating agent 124 and the secondary gas generating agent 122, approximately 3 to 4 g of the secondary gas generating agent 122 is required to burn 35 g of the main gas generating agent 124. Further, approximately 4.5 to 11 g of the secondary gas generating agent 122 is required to burn 60 g of the main gas generating agent 124. In other words, the amount of the secondary gas generating agent 122 to the amount of the main gas generating agent 124 is between 1:5.5 and 1:13.5.

Next, referring to FIG. 6, the initiator 114 will be described in detail. The initiator 114 includes a header 131, a powder holding portion 132, a container 133, an insulating member 134, a first powder 135, a resin molding 136, a bridge wire 137, a second powder 138, and an electrode 139 connected to a collision sensor of the vehicle.

ZPP (Zirconium Potassium Percholate) is used as the first powder 135, and THPP (Titanium Hydride Potassium Percholate) is used as the second powder 138. A total amount of powder charged into the initiator 114 is preferably set between 400 mg (ZPP 50 mg:THPP 350 mg) and 600 mg (ZPP 50 mg:THPP 550 mg) to ensure that a sufficient shockwave is generated. Further, a weight ratio between the powder (135, 138) in the initiator 114 and the secondary gas generating agent 122 described above is preferably set between 1:5 and 1:27.5.

When the total amount of the powder (135, 138) is smaller than 400 mg, for example, a small shockwave and little combustion heat are generated, leading to an increase in the ignition delay and ignition variation, especially at low temperatures. Conversely, when the total amount of the powder (135, 138) exceeds 600 mg, the shockwave and the amount of combustion heat are excessively large, and therefore the shockwave and combustion heat extend beyond the secondary gas generation chamber 116 (FIG. 5) to affect the main gas generation chamber 118 such that the main gas generating agent 124 burns rapidly. As a result, an internal pressure of the gas generator 100 may exceed a withstand pressure, causing the gas generator 100 to break. Further, the inflation gas is supplied to the airbag from the gas generator 100 rapidly, and therefore the airbag may deploy too quickly, thereby obstructing the occupant.

When an ignition current is supplied to the electrode 139 from the collision sensor (not shown), a current flows through the bridge wire 137 connected to the header 131 such that heat is generated. When the bridge wire 137 generates heat, the first powder 135 contacting the bridge wire 137 is heated and ignited. When the first powder 135 is ignited, the second powder 138 is ignited by combustion gas from the first powder 135, and as a result, combustion gas is generated. The combustion gas from the second powder 138 ruptures the container 133 so as to be discharged to the exterior of the initiator 114. A combustion velocity of the ZPP and the THPP is high, and therefore a shockwave is generated in addition to the combustion gas.

The shockwave pulverizes the secondary gas generating agent 122, leading to an immediate increase in the surface area thereof. Thus, the secondary gas generating agent 122 is burned instantaneously. Hence, in this embodiment, ZPP and/or THPP or the like are charged in appropriate amounts into the interior of the initiator 114 as the powder that generates the shockwave, and therefore the secondary gas generating agent 122 can be pulverized and burned instantaneously. Moreover, the main gas generating agent 124 can be burned reliably without a delay.

Figure 7:
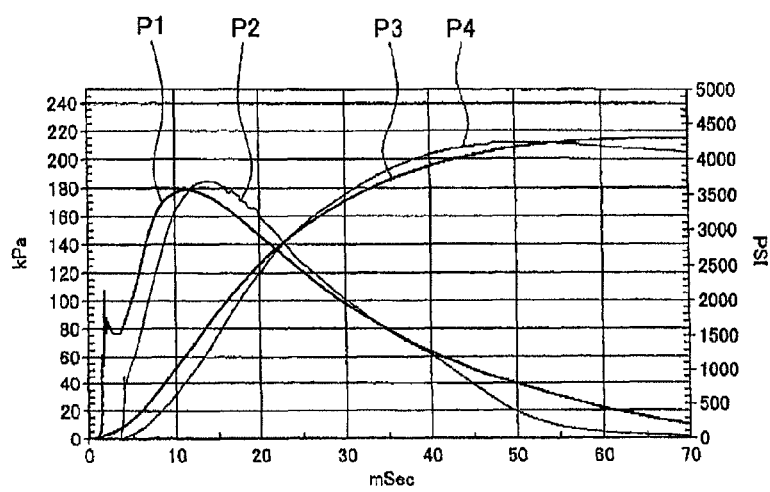
FIG. 7 is a graph showing a characteristic of a gas generator for an airbag device according to FIGS. 5 and 6.
Figure 8:
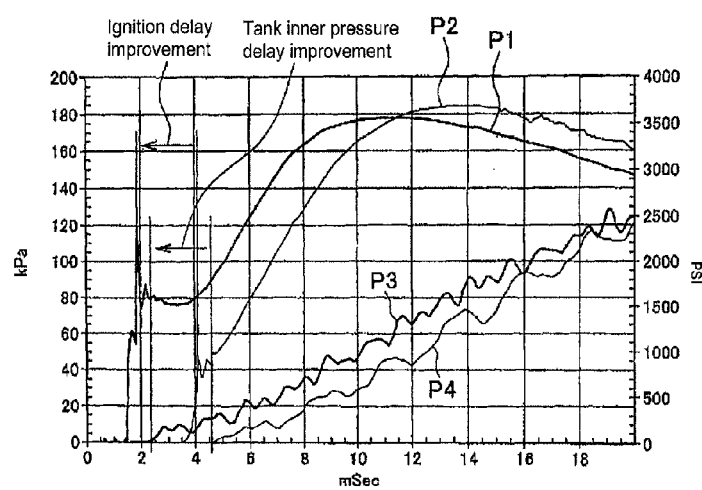
FIG. 8 is a graph showing a partial enlargement (i.e. details) of FIG. 7.

FIG. 7 is a graph showing a characteristic of the gas generator for an airbag device 100 according to the second embodiment of the present invention, and FIG. 8 is a graph showing a partial enlargement (i.e. details) of FIG. 7. In FIG. 7, the abscissa shows time, a left ordinate shows a tank inner pressure, and a right ordinate shows an internal pressure of the housing 112. Here, the tank is a 60 liter metallic closed container used in an ignition test performed on the inflator (100), and [the tank inner pressure] is considered equivalent to the internal pressure of the airbag. The pressure is expressed as PSI (pounds per square inch), where 1 psi=6.895 kPa.

Reference symbols in FIGS. 7 and 8 have the following meanings.

P1 stands for the inner pressure (chamber inner pressure) of the gas generator 100 according to this embodiment.

P2] stands for the inner pressure (chamber inner pressure) of a conventional gas generator.

P3 stands for the tank inner pressure corresponding to the gas generator 100 according to this embodiment.

P4 stands for the tank inner pressure corresponding to the conventional gas generator.

As is evident from the graphs in FIGS. 7 and 8, according to the present invention, the ignition delay in the main gas generating agent 124 is improved, and the inflation gas is supplied into the airbag (into the tank) quickly.

The second embodiment (driving seat single type) of the present invention was described above, but the present invention is not limited to this embodiment and may be applied to gas generators using other ignition methods. Other embodiments will be described below.

Figure 9:
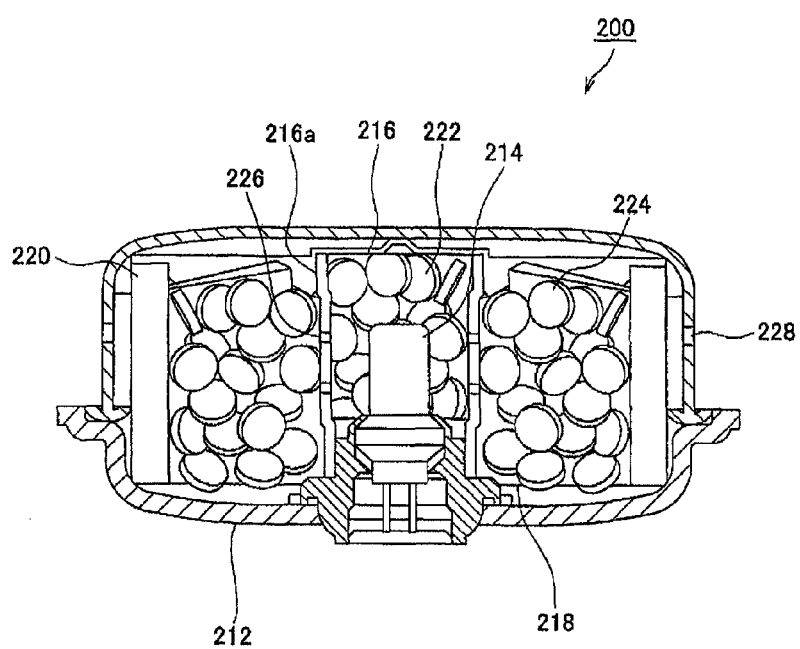
FIG. 9 is a sectional view showing the structure of a gas generator for an airbag device (front passenger seat single type) according to a third embodiment of the present invention.

FIG. 9 is a sectional view showing the structure of a gas generator for an airbag device (front passenger seat single type) 200 according to a third embodiment of the present invention. In this embodiment, it is noted that the structure of the initiator and the principles by which the secondary gas generating agent is pulverized and burned are similar to those of the second embodiment.

A gas generator for an airbag device 200 according to this embodiment includes a deployment activating initiator 214 that accommodates a predetermined amount of ignition powder and is activated by an impact on the vehicle, a main gas generating agent 224 that generates main gas for inflating the airbag when burned, a main gas generation chamber 218 that accommodates the main gas generating agent 224, a secondary gas generation chamber 216 that is provided interiorly of the main gas generation chamber 218 and accommodates the initiator 214, and a secondary gas generating agent 222 accommodated in the secondary gas generation chamber 216. When the initiator 214 is activated, a shockwave is generated, and the secondary gas generating agent 222 is pulverized and burned by the shockwave. When the secondary gas generating agent 222 burns, the main gas generating agent 224 is ignited.

The gas generator 200 also includes a housing 212 constituted by an upper-lower pair of shells. The housing 212 may be molded by casting, forging, pressing, and so on. A plurality of gas discharging holes 228 are provided in a circumferential direction in a peripheral wall portion of the housing 212, and the airbag (not shown) is inflated and deployed by gas discharged through the discharging holes 228.

An igniter cup 216a forming the secondary gas generation chamber 216 may be formed by casting, forging, pressing, cutting, and so on, or a combination thereof. The initiator 214 is accommodated in the igniter cup 216a. A through hole 226 is formed in a peripheral wall of the igniter cup 216a as a flow passage for a flame that serves as a combustion source of the main gas generating agent 224 in the main gas generation chamber 218.

Here, the secondary gas generation chamber 216 must be surrounded by partition walls inside the main gas generation chamber 218, but as long as the secondary gas generation chamber 216 can be kept isolated from the main gas generation chamber 218 during the moment immediately before the shockwave passes through (until the secondary gas generating agent 222 is completely pulverized), an upper portion of the secondary gas generation chamber 216 does not necessarily have to be covered, or may be covered.

A coolant filter 220 for cleaning and cooling the gas that is generated upon ignition and combustion of the main gas generating agent 224 is provided in the housing 212. The coolant filter 220 is disposed to surround the main gas generating agent 224, and defines a ring-shaped chamber, or in other words the main gas generation chamber 218, on the periphery of the igniter cup 216a. The coolant filter 220 may be formed by laminating stainless steel wire mesh, for example, in a radial direction and then compressing the laminated wire mesh in the radial direction and an axial direction.

A columnar gas generating agent is used as the gas generating agent 224 since it is easy to manufacture and can be charged at a high density. In this embodiment, identical agents are used as the main gas generating agent 224 and the secondary gas generating agent 222. A nitrate-based powder containing an oxidant (basic copper (II) nitrate) and a combustible (guanidine nitrate) as main components is used as the gas generating agent 222, 224. The shape of the gas generating agent 222, 224 may be set at approximately diameter 6 mm, thickness 2 mm (1.6 to 2.5 mm). Note that gas generating agents having different shapes and compositions may be used as the main gas generating agent 224 and the secondary gas generating agent 222.

When an ignition current is supplied to the initiator 214 from the collision sensor (not shown), the secondary gas generating agent 222 is pulverized by the shockwave, similarly to the second embodiment, leading to an immediate increase in the surface area thereof. Thus, the secondary gas generating agent 222 is burned instantaneously. Moreover, the main gas generating agent 224 is burned without a delay, and therefore the inflation gas is supplied into the airbag quickly.

Figure 10:
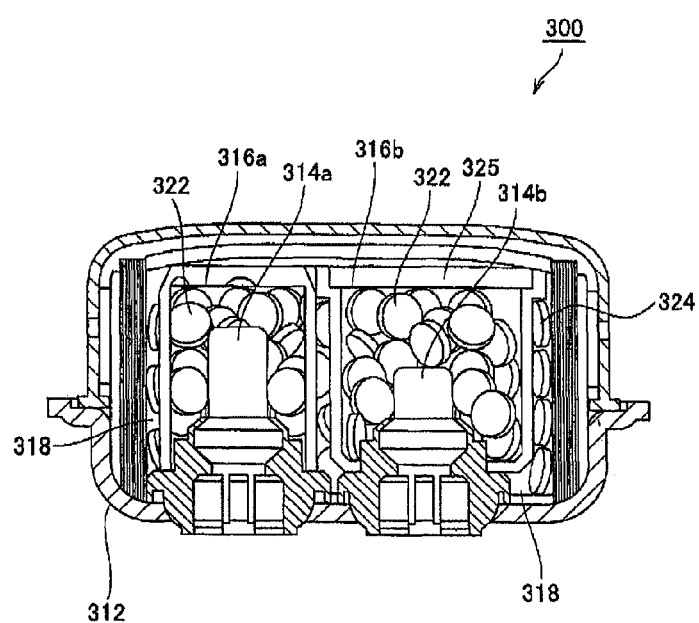
FIG. 10 is a sectional view showing the structure of a gas generator for an airbag device (driving seat dual type) according to a fourth embodiment of the present invention.

FIG. 10 is a sectional view showing the structure of a gas generator for an airbag device (driving seat dual type) according to a fourth embodiment of the present invention. Note that the structure of the initiator and the principles by which the secondary gas generating agent is pulverized and burned are similar to those of the second embodiment.

A gas generator for an airbag device 300 according to this embodiment includes deployment activating initiators 314a, 314b that accommodate a predetermined amount of ignition powder and are activated by an impact on the vehicle, a main gas generating agent 324 that generates main gas for inflating the airbag when burned, a main gas generation chamber 318 that accommodates the main gas generating agent 324, a first stage secondary gas generation chamber 316a that is provided in an interior of the main gas generation chamber 318 and accommodates the first stage initiator 314a, and a first stage secondary gas generating agent 322 accommodated in the first stage secondary gas generation chamber 316a. When the initiator 314a is activated, a shockwave is generated, and the first stage secondary gas generating agent 322 is pulverized and burned by the shockwave. When the first stage secondary gas generating agent 322 burns, the main gas generating agent 324 is ignited.

The gas generator for an airbag device 300 according to this embodiment is a two-stage ignition type (dual type) gas generator, and therefore second stage gas generating agent 322 in a second stage secondary gas generation chamber 316b is burned by the combustion gas of the first stage gas generating agent 322 when an upper portion lid 325 is opened upon ignition of a second stage initiator 314b.

Accordingly, the amount of powder in the second stage initiator 314b may be smaller than the amount of powder in the first stage initiator, typically 50 mg to 200 mg of ZPP or 50 mg of ZPP+130 mg to 200 mg of BKNO3 (boron potassium nitrate). Alternatively, 50 mg of ZPP+100 mg to 150 mg of THPP may be used.

The gas generator 300 also includes a housing 312 constituted by an upper-lower pair of shells. The housing 312 may be molded by casting, forging, pressing, and so on. A plurality of gas discharging holes are provided in a circumferential direction in a peripheral wall portion of the housing 312, and the airbag (not shown) is inflated and deployed by gas discharged through the discharging holes.

Here, the first stage secondary gas generation chamber 316a must be surrounded by partition walls inside the main gas generation chamber 318, but as long as the first stage secondary gas generation chamber 316a can be kept isolated from the main gas generation chamber 318 during the moment immediately before the shockwave passes through (until the first stage secondary gas generating agent 322 is completely pulverized), an upper portion of the first stage secondary gas generation chamber 316a does not necessarily have to be covered, or may be covered.

A coolant filter for cleaning and cooling the gas that is generated upon ignition and combustion of the main gas generating agent 324 is provided in the housing 312. The coolant filter is disposed to surround the main gas generating agent 324, and defines the main gas generation chamber 318.

A columnar gas generating agent is used as the gas generating agent 324 since it is easy to manufacture and can be charged at a high density. In this embodiment, identical agents are used as the main gas generating agent 324 and the first and second stage secondary gas generating agent 322. A nitrate-based powder containing an oxidant (basic copper (II) nitrate) and a combustible (guanidine nitrate) as main components is used as the gas generating agent 322, 324. The shape of the gas generating agent 322, 324 may be set at approximately diameter 6 mm, thickness 2 mm (1.6 to 2.5 mm). Note that gas generating agents having different shapes and compositions may be used as the main gas generating agent 324 and the first and second stage secondary gas generating agent 322.

When an ignition current is supplied to the initiator 314a from the collision sensor (not shown), the first stage secondary gas generating agent 322 is pulverized by the shockwave, similarly to the second embodiment, leading to an immediate increase in the surface area thereof. Thus, the first stage secondary gas generating agent 322 is burned instantaneously. Moreover, the main gas generating agent 324 is burned without a delay, and therefore the inflation gas is supplied into the airbag quickly.

Figure 11:
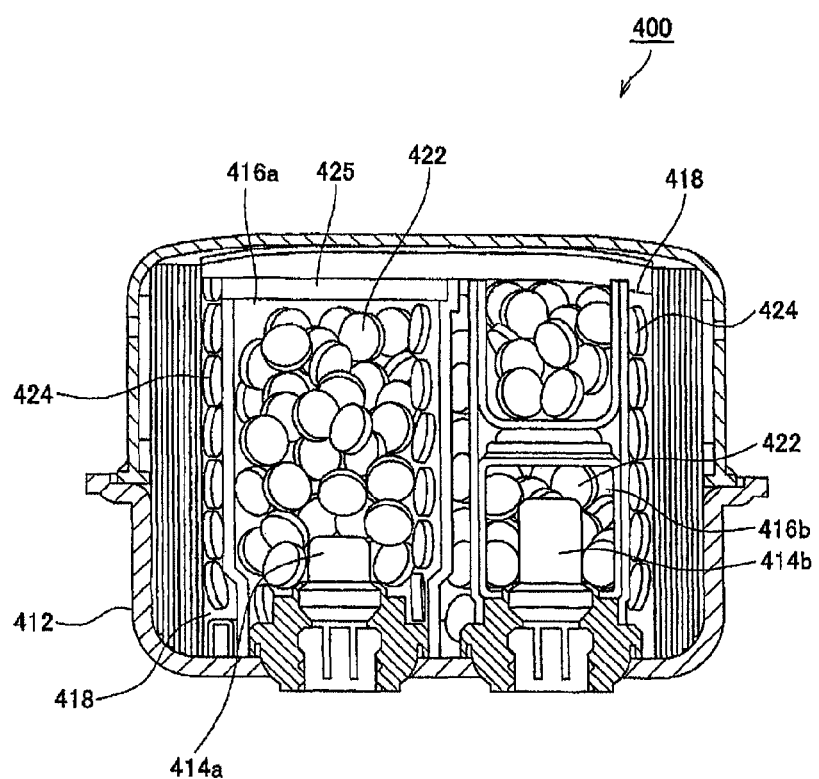
FIG. 11 is a sectional view showing the structure of a gas generator for an airbag device (front passenger seat dual type) according to a fifth embodiment of the present invention.

FIG. 11 is a sectional view showing the structure of a gas generator for an airbag device (front passenger seat dual type) according to a fifth embodiment of the present invention. Note that the structure of the initiator and the principles by which the secondary gas generating agent is pulverized and burned are similar to those of the second embodiment.

A gas generator for an airbag device 400 according to this embodiment includes deployment activating initiators 414a, 414b that accommodate a predetermined amount of ignition powder and are activated by an impact on the vehicle, a main gas generating agent 424 that generates main gas for inflating the airbag when burned, a main gas generation chamber 418 that accommodates the main gas generating agent 424, a first stage secondary gas generation chamber 416a that is provided in an interior of the main gas generation chamber 418 and accommodates the first stage initiator 414a, and a first stage secondary gas generating agent 422 accommodated in the first stage secondary gas generation chamber 416a. When the first stage initiator 414a is activated, a shockwave is generated, and the first stage secondary gas generating agent 422 is pulverized and burned by the shockwave. When the first stage secondary gas generating agent 422 burns, the main gas generating agent 424 is ignited.

The gas generator for an airbag device 400 according to this embodiment is a two-stage ignition type (dual type) gas generator, and therefore the second stage gas generating agent 422 in a second stage secondary gas generation chamber 416b is burned by the combustion gas of the first stage secondary gas generating agent when an upper portion lid 425 is opened upon ignition of the initiator 414b.

Accordingly, the amount of powder in the initiator 414b may be smaller than the amount of powder in the first stage initiator 414a, typically 50 mg to 200 mg of ZPP or 50 mg of ZPP+130 mg to 200 mg of BMNO3 (boron potassium nitrate). Alternatively, 50 mg of ZPP+100 mg to 150 mg of THPP may be used.

The gas generator 400 also includes a housing 412 constituted by an upper-lower pair of shells. The housing 412 may be molded by casting, forging, pressing, and so on. A plurality of gas discharging holes are provided in a circumferential direction in a peripheral wall portion of the housing 412, and the airbag (not shown) is inflated and deployed by gas discharged through the discharging holes.

Here, the first stage secondary gas generation chamber 416a must be surrounded by partition walls inside the main gas generation chamber 418, but as long as the secondary gas generation chamber 416a can be kept isolated from the main gas generation chamber 418 during the moment immediately before the shockwave passes through (until the secondary gas generating agent 422 is completely pulverized), an upper portion of the secondary gas generation chamber 416a does not necessarily have to be covered, or may be covered.

A coolant filter for cleaning and cooling the gas that is generated upon ignition and combustion of the main gas generating agent 424 is provided in the housing 412. The coolant filter is disposed to surround the main gas generating agent 424, and defines the main gas generation chamber 418.

A columnar gas generating agent is used as the gas generating agent 424 since it is easy to manufacture and can be charged at a high density. In this embodiment, identical agents are used as the main gas generating agent 424 and the first and second secondary gas generating agent 422. A nitrate-based powder containing an oxidant (basic copper (II) nitrate) and a combustible (guanidine nitrate) as main components is used as the gas generating agent 422, 424. The shape of the gas generating agent 422, 424 may be set at approximately diameter 6 mm, thickness 2 mm (1.6 to 2.5 mm). Note that gas generating agents having different shapes and compositions may be used as the main gas generating agent 424 and the secondary gas generating agent 422.

When an ignition current is supplied to the first stage initiator 414a from the collision sensor (not shown), the first stage secondary gas generating agent 422 is pulverized by the shockwave, similarly to the second embodiment, leading to an immediate increase in the surface area thereof. Thus, the first stage secondary gas generating agent 422 is burned instantaneously. Moreover, the main gas generating agent 424 is burned without a delay, and therefore the inflation gas is supplied into the airbag quickly.

Figure 12:
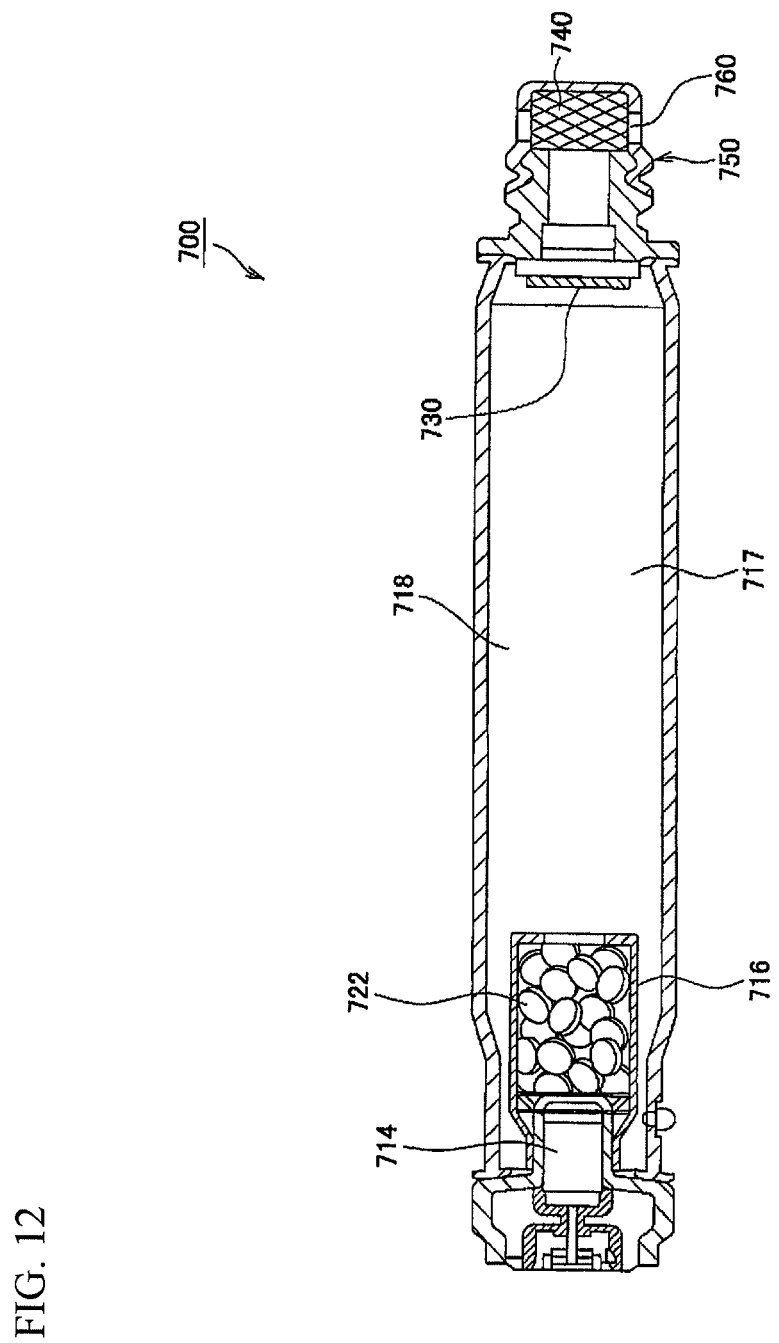
FIG. 12 is a sectional view showing the structure of a gas generator for an airbag device (hybrid type) according to a sixth embodiment of the present invention.

FIG. 12 is a sectional view showing the structure of a gas generator for an airbag device (hybrid type) according to a sixth embodiment of the present invention. This type of gas generator is used for a front passenger seat airbag, a side airbag, a curtain airbag, and so on by adjusting the shape of the gas accommodating container, the amount of gas, and so on. Note that the structure of the initiator and the principles by which the secondary gas generating agent is pulverized and burned are similar to those of the first embodiment.

A gas generator for an airbag device 700 according to this embodiment includes a deployment activating initiator 714 that accommodates a predetermined amount of ignition powder and is activated by an impact on the vehicle, a main gas 717 for inflating the airbag, a main gas holding chamber 718 that accommodates the main gas 717, a secondary gas generation chamber 716 that is provided in an interior of the main gas holding chamber 718 and accommodates the initiator 714, and a secondary gas generating agent 722 accommodated in the secondary gas generation chamber 716. When the initiator 714 is activated, a shockwave is generated, and the secondary gas generating agent 722 is pulverized and burned by the shockwave. When the secondary gas generating agent 722 burns, the main gas 717 is heated.

The main gas 7171 is typically constituted by helium gas and argon gas, and is compressed into a high pressure condition of approximately 3000 PSI to 5000 PSI and held in the main gas holding chamber. During an operation, the high pressure gas ruptures a pressure partition wall 730, passes through a screen 740 provided in a holder 750, and is discharged through a gas discharging port 760.

A columnar gas generating agent is used as the secondary gas generating agent 722 since it is easy to manufacture and can be charged at a high density. A nitrate-based powder containing an oxidant (basic copper (II) nitrate) and a combustible (guanidine nitrate) as main components is used as the gas generating agent 722. The shape of the gas generating agent 722 may be set at approximately diameter 6 mm, thickness 2 mm (1.6 to 2.5 mm).

When an ignition current is supplied to the initiator 714 from the collision sensor (not shown), the secondary gas generating agent 722 is pulverized by the shockwave, similarly to the second embodiment, leading to an immediate increase in the surface area thereof. Thus, the secondary gas generating agent 722 is burned instantaneously. Moreover, the main gas 717 is burned without a delay, and therefore the inflation gas is supplied into the airbag quickly.

Following combustion of the secondary gas generating agent, the main gas is heated rapidly. As a result, the main gas expands so as to rupture the pressure partition wall 730 quickly, and is then discharged through the gas discharging port.

Embodiments of the present invention were described above, but the present invention is not limited to the above embodiments and may be subjected to various design modifications and the like within a scope that does not depart from the technical spirit of the claims.

The invention claimed is:

1. A gas generator for inflating an airbag of an airbag device of in a vehicle, comprising:
   a deployment activating initiator having a predetermined amount of ignition powder therein and configured to be activated by an impact on the vehicle;
   a main gas generating agent that generates a main gas for inflating the airbag when burned, the main gas generating agent being circumferentially surrounded by a filter;
   wall portions defining a housing within which the main gas generating agent and filter are located;
   additional wall portions defining a secondary gas generation chamber within which the initiator is located, the initiator being centrally located within the secondary gas generation chamber, the additional wall portions further being circumferentially surrounded by the filter so that the filter and the additional wall portions cooperate to define a main gas generation chamber within which the main gas generating agent is located;
   a secondary gas generating agent located within the secondary gas generation chamber about the initiator, the secondary gas generating agent and the main gas generating agent being the same material, and the secondary gas generation chamber being provided such that the secondary gas generating agent surrounds a top and sides of the initiator; and
   wherein the initiator is configured such that when the initiator is activated, a shockwave is generated around the top and sides of the initiator and the secondary gas generating agent is pulverized and burned by the shockwave, whereupon the main gas generating agent is ignited by the burning of the secondary gas generating agent, and a total amount of the ignition powder charged into the initiator is in a range of 400 to 600 mg.

2. The gas generator for an airbag device according to claim 1, wherein the ignition powder is at least one of ZPP and/or THPP.

3. The gas generator for an airbag device according to claim 1, wherein a nitrate-based gas generating agent is used as the main gas generating agent and the secondary gas generating agent.

4. The gas generator for an airbag device according to claim 1, wherein a weight ratio between the ignition powder in the initiator and the secondary gas generating agent is between 1:5 and 1:27.5.

5. The gas generator for an airbag device according to claim 1, wherein a weight ratio between the secondary gas generating agent and the main gas generating agent is between 1:5.5 and 1:13.5.

6. The gas generator for an airbag device according to claim 1, wherein a hole through which a combustion gas escapes is provided in the wall portions defining the secondary gas generation chamber.

7. The gas generator for an airbag device according to claim 1, further comprising an intermediate lid that unitarily covers the upper portion of the main gas generation chamber and the secondary gas generation chamber and cooperates to define each of the main and secondary gas generation chambers.

8. The gas generator for an airbag device according to claim 1, wherein the secondary gas generation chamber is sealed off from the main gas generation chamber.

9. The gas generator for an airbag device according to claim 8, wherein a hole through which a combustion gas escapes is provided in the wall portions defining the secondary gas generation chamber, the hole being covered by a rupturable seal.

* * * * *